Figure 1:
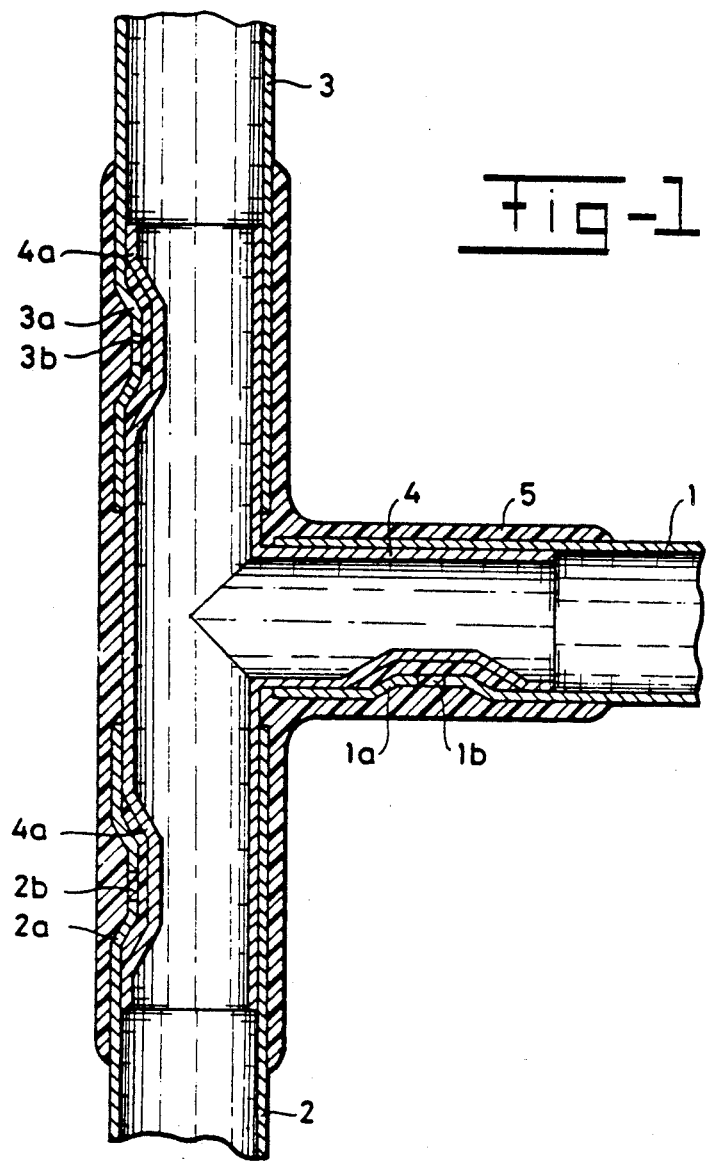

United States Patent [19]

Tiekink

[11] Patent Number: 4,998,337
[45] Date of Patent: Mar. 12, 1991

[54] METHOD FOR THE PERMANENT MUTUAL CONNECTION OF ALREADY FINISHED METAL TUBES

[75] Inventor: Jozef J. Tiekink, Harderwijk, Netherlands

[73] Assignee: Reynolds Aluminium Holland B.V., Harderwijk, Netherlands

[21] Appl. No.: 410,819

[22] Filed: Sep. 22, 1989

[51] Int. Cl.$^5$ .............................................. B23P 17/00
[52] U.S. Cl. ................................ 29/527.4; 29/33 T; 29/517; 29/521; 29/890.149; 138/149; 285/45; 285/290; 285/292; 403/285
[58] Field of Search ............ 29/521, 517, 527.4, 29/33 T, 157 T, 525, 890.149; 285/21, 45, 240, 292, 294; 403/285; 138/149, 155

[56] References Cited

U.S. PATENT DOCUMENTS 2,233,471 3/1941 Clements ........................... 29/517 X
2,917,569 12/1959 Senior, Jr. ........................ 403/285 X

FOREIGN PATENT DOCUMENTS 750758 1/1967 Canada ............................. 138/149
125735 11/1984 European Pat. Off. .

Primary Examiner—Carl E. Hall
Assistant Examiner—Carl J. Arbes
Attorney, Agent, or Firm—Bachman & LaPointe

[57] ABSTRACT

Method for the permanent mutual connection of the ends of at least two already finished metal tubes (1,2,3), consisting in placing the ends of said tubes in a mould, particularly an injection moulding mould, whereby one tube end or several tube ends is or are arranged around a tubular part of a metal body (4), closing the mould and filling the mould with liquid plastics material, so that after the setting of the plastics material and the opening of the mould the ends of the tubes (1,2,3) are joined together, whereby before closing the mould the or each of said tube ends (1,2,3) as well as the tubulous part of the metal body (4) present therein is locally depressed over a certain distance.

2 Claims, 1 Drawing Sheet

METHOD FOR THE PERMANENT MUTUAL CONNECTION OF ALREADY FINISHED METAL TUBES

DESCRIPTION

The invention relates to a method for the permanent mutual connection of the ends of at least two already finished metal tubes, consisting in placing the ends of said tubes in a mould, particularly an injection moulding whereby one tube end or several tube ends is or are arranged around a tubular part of a metal body, closing the mould and filling the mould with liquid plastics material, so that after the setting of the plastics material and the opening of the mould the ends of the tubes are joined together.

Such a method is known from EP-B-O 125 735 of Applicant.

Although with this known method good results are obtained the formed connection is not strong enough for heavily loaded tube joints.

The invention aims to improve the method, so that a tube joint is obtained with a high tensile strength so that a structure can be built capable for taking up high dynamic forces.

According to the invention this is obtained in that before closing the mould the or each of said tube ends as well as the tubulous part of the metal body present therein is locally depressed over a certain distance.

When the tube ends to be connected are aligned according to the invention the tubulous part is formed by the other tube end.

Figure 2:
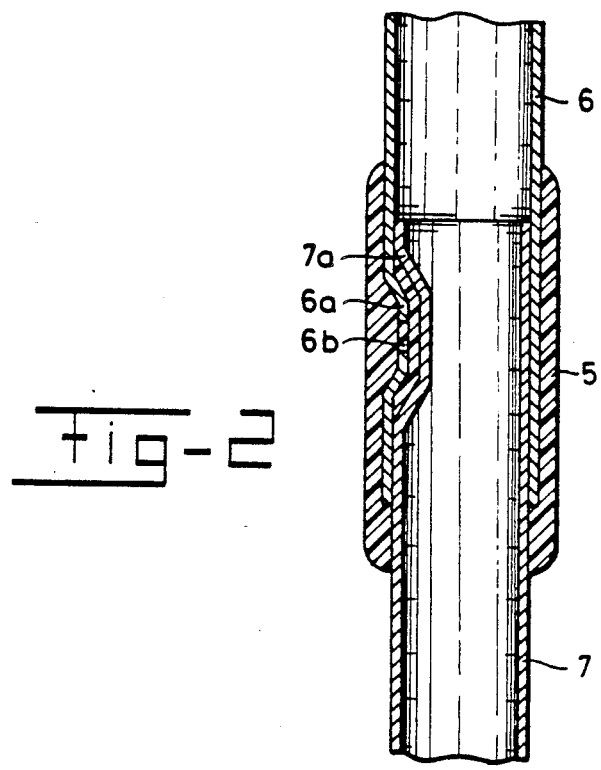

The invention will be explained more fully with reference to the drawing, in which FIG. 1 is a longitudinal section through a T-shaped tube joint; and FIG. 2 is a longitudinal section through a joint whereby the tubes to be connected are aligned.

The tubes 1, 2 and 3 may for instance consist of extruded aluminium and are completely furnished, preferably anodised, in advance.

However, the method according to the invention is also suitable for other kinds of metal tubes, which are finished in another way.

Before the tube ends are arranged in the non-shown injection moulding mould, they are shifted upon the ends of a T-shaped metal body, indicated with 4.

Also before the arrangement of the tube ends in the mould, the tube ends and the metal tubulous body 4 are locally depressed, such as indicated with 1a, 4a, respectively 2a, 4a and 3a, 4a.

In the depressions 1a, 2a and 3a an aperture is present indicated with 1b, 2b and 3b respectively.

In this condition the tubes 1, 2 and 3 and the metal body 4 are arranged in the non-shown mould.

Subsequently the mould is closed in a conventional way and a suitable plastics material such as polyamid is supplied. After setting the mould can be opened and a tube joint is obtained, such as shown in FIG. 1. No single follow-up treatment is necessary and a very strong tube joint is obtained.

By the presence of the apertures 1b, 2b and 3b the liquid plastic material will also penetrate the space between the depressions 1a, 4a and so on.

If it concerns the connection of two aligned tube ends, a separate metal body 4 is not necessary and in fact this metal body is formed by the end of th other tube. This structure is shown in FIG. 2, wherein the tubes to be connected are indicated with 6 and 7.

The depressions are indicated with 6a, 7a resp. and the aperture in the depression 6a with 6b.

The formed plastics socket is indicated with 5 as well as in FIG. 1.

It will be clear that the invention is not restricted to the connection of two aligned tubes as to tubes which are connected in a T-shape.

The metal body according to FIG. 1 can have different shapes.

I claim:

1. A method for forming a permanent connection between at least two finished metal tubes comprising: providing a metal body having at least two ends, locating each of said at least two finished metal tubes on one of said at least two ends of said metal body so as to form at least two overlapped body-tube joints, locally depressing a portion of said overlapped body-tube joints so as to form an aperture thereon, molding a liquid plastic material on said overlapped body-tube joints and in said apertures, and setting said liquid plastic material so as to form a permanent connection.

2. A method of forming a permanent connection between at least two finished metal tubes comprising: locating an end of each of said at least metal tubes in overlapping relationship so as to form an overlapped tube joint, locally depressing a portion of said overlapped tube joint so as to form an aperture thereon, molding a liquid plastic material on said overlapped tube joint and said aperture, and setting said plastic material so as to form a permanent connection between said metal tubes.

* * * * *